United States Patent [19]
Heidorf et al.

[11] Patent Number: 5,131,424
[45] Date of Patent: Jul. 21, 1992

[54] PRECISION PRESSURE CONTROL SYSTEM

[76] Inventors: Christian J. Heidorf, 8 Catherine St., Gansevoort, N.Y. 12831; Sam Richard, III, 401 4th Ave., South Charleston, W. Va. 25303

[21] Appl. No.: 656,550

[22] Filed: Feb. 19, 1991

[51] Int. Cl.$^5$ ............................................. G05D 16/06
[52] U.S. Cl. .................................... 137/102; 137/489; 137/206
[58] Field of Search ............ 137/209, 489, 102, 116.3, 137/206

[56] References Cited

U.S. PATENT DOCUMENTS

| | | |
|---|---|---|
| 843,174 | 2/1907 | Reynolds . |
| 1,982,045 | 11/1934 | Clithero et al. . |
| 2,707,970 | 5/1955 | Hughes . |
| 3,132,659 | 5/1964 | Kenyon . |
| 3,414,008 | 12/1968 | Greenwood . |
| 3,477,456 | 11/1969 | Powell . |
| 3,592,224 | 7/1971 | Bois . |
| 3,858,598 | 1/1975 | Carman .............................. 137/102 |
| 4,245,663 | 1/1981 | Solowy . |
| 4,274,440 | 6/1981 | Richard ......................... 137/489 X |
| 4,312,375 | 1/1982 | Leinemann . |
| 4,402,341 | 9/1983 | Reip . |
| 4,425,938 | 1/1984 | Papa et al. . |

Primary Examiner—Alan Cohan
Attorney, Agent, or Firm—Fleit, Jacobson, Cohn, Price, Holman & Stern

[57] ABSTRACT

A precision pressure regulator not only providing makeup pressure in response to a low pressure condition, but also for providing the ability to vent off excess pressure. A system in a self-contained unit is used, thereby eliminating a need for an external power supply such as battery, electrical, or mechanical power. The precision pressure regulator also provides extremely accurate control of pressure even in the low pressure ranges of less than 1 inch of water column, and does so without the need for constant supervision by a skilled technician. A safe inert atmosphere is provided for chemical processes utilizing volatile and/or contaminant sensitive substances.

7 Claims, 3 Drawing Sheets

PRECISION PRESSURE CONTROL SYSTEM

FIELD OF THE INVENTION

The invention relates to an improvement in a precision pressure regulating device, and in particular, a pressure regulating device capable of not only providing make-up pressure to a pressurized vessel, but as a result of the improvement, also capable of venting off excess pressure.

BACKGROUND OF THE INVENTION

The blanketing or padding (pressurization) of chemical process systems with an inert gas is a concept widely known and used in the chemical industry to displace undesirable contaminants located in a vapor space and to prevent re-introduction of the contaminants into the vapor space. Padding with inert gas also provides an atmosphere in which the handling, processing, and reacting of chemicals can be performed safely and economically without fear of contamination, unwanted side reactions, or the development of potentially explosive mixtures.

As is commonly known, for combustion to take place in a chemical process, the three components of the "combustion triangle" must all be present. These components are oxygen, fuel, and an energy source. Combustion cannot occur if any one of these components is missing or otherwise present in an insufficient concentration.

For many chemical processes, a fuel component must be present in the system. The fuel itself usually forms an integral part of the process, and it is therefore highly impractical to eliminate this component of the combustion triangle.

An energy source, on the other hand, is usually an undesirable and ever present by-product of a chemical process. Therefore, eliminating an energy source from the process becomes a very difficult task, if not an impossible one. As an example, static electricity can be generated by a plurality of individual events which commonly occur in chemical processes. An energy source producing event can include the pneumatic conveying of finely ground solids through pipelines or chutes, agitation of single or multiple phase systems, movement of non-conductive liquids past a solid surface, high speed separation of two phase mixtures, liquids free-falling or splashing in air, aeration of single or multiple phase systems, etc. Clearly, with so many possible sources of static electricity, static electricity build-up is difficult to prevent. What is even more difficult to prevent is the eventual discharge of the generated electricity. As a result, the energy source component of the combustion triangle remains a highly impractical element to remove from a chemical process.

The final component, and most practical to control, is the concentration of oxygen in the system. By minimizing the oxygen concentration, one of the combustion triangle's key elements is thus eliminated, and the result is a safer environment in which the chemical process is allowed to occur with a less likely possibility of an unexpected explosion.

In addition to the reduction of oxygen, other chemical systems, in preparation for the handling of chemicals, may require the displacement of vapor space contaminants such as moisture or other vapor phase chemicals from a storage container. Two methods commonly used to accomplish elimination of vapor space contaminants along with oxygen reduction, are the continuous purge method involving high volume purging of the system with an inert gas, and the pad-depad method involving the pressurization and subsequent de-pressurization of the system with an inert gas. The pad-depad method is hereinafter referred to as the PDP method.

The continuous purge method can be ineffective in systems handling volatile chemicals where vapor pockets or stratification may occur. The flow path of the purging inert gas may not reach vapor pockets nor sufficiently disturb stratification. It cannot be assumed that the mere flooding of a system with a high volume purging inert gas will sufficiently dilute or displace all the vapor space undesirables in the system. The effectiveness of a continuous purge using inert gas is flow path and quantity dependent and can only be substantiated with costly oxygen analyzing systems. Subsequently, the net cost of performing high volume purges by inert gas to prepare systems for use of flammable chemicals is certain to be much higher than preparing the system using the PDP method.

The PDP method insures access to all spaces within a system, primarily because pressure permeates all open voids. Hence, attempts to reach suspect areas with an inert gas to dilute and subsequently displace the contaminant is guaranteed. The ability to dilute and replace a vapor space contaminant, such as oxygen with an inert gas such as nitrogen can be explained by the application of Boyle's-Charles' fundamental gas laws. In a confined space of a given volume, the pressure will increase when an equal volume of gas is introduced to the gas already present. By doubling the pressure in a confined space containing air (containing 21% oxygen) at atmospheric pressure, the actual volume of gas is essentially doubled at standard temperature and pressure. Since oxygen and nitrogen are infinitely soluble in each other, a doubling of the volume by the addition of nitrogen will decrease the net amount of oxygen per cubic foot of gas (air) at 1 atmosphere by 50%. Hence, by padding a system to 2 atmospheres, (approximately fifteen PSIG) with nitrogen and then depadding to one atmosphere (zero PSIG), the oxygen concentration in the mixture is reduced to 10.5%. Repetition of this procedure will continue to reduce the oxygen concentration by 50% each time, i.e., 5.25% for the second repetition and 2.125% for the third repetition.

The number of repetitions can be reduced by making each padding step an increase to three atmospheres (approximately thirty PSIG) and depadding to one atmosphere (zero PSIG). In this manner, the oxygen concentration in the gas (air) space is reduced by a factor of ⅔ each repetition, i.e. to 7% for the first repetition and 2.3% for the second repetition.

The PDP method is more reliable, inherently more predictable, and unquestionably more simple and economical than the continuous purge method. It also does not require the use of a highly skilled technician and is basically maintenance free, requiring only a source of inert gas as the motive force. Maintaining a constant positive pressure with appropriate pressure controls such as the PDP unit, using inert gas, after completion of the initial PDP sequence, will guarantee the presence of a relatively inert atmosphere. The need for expensive oxygen monitoring instrumentation can be reserved for extremely intense applications where the concentration of oxygen needs to be monitored for intermittent adjustments.

In the past, the decision to precisely control pressure in the low pressure range, (i.e. less than one PSIG) had been addressed by manifolding a common pressure regulator with a back pressure regulator. The back pressure regulator served to vent the system on high pressures and the pressure regulator provided make-up pressure on demand. This concept is simply not capable of precisely controlling the pressure by plus or minus 0.25 inches water column in the less than one PSIG range. Such a system exhibits very poor pressure control characteristics with fluctuations above and below 30% of the desired set point value.

Figure 1:
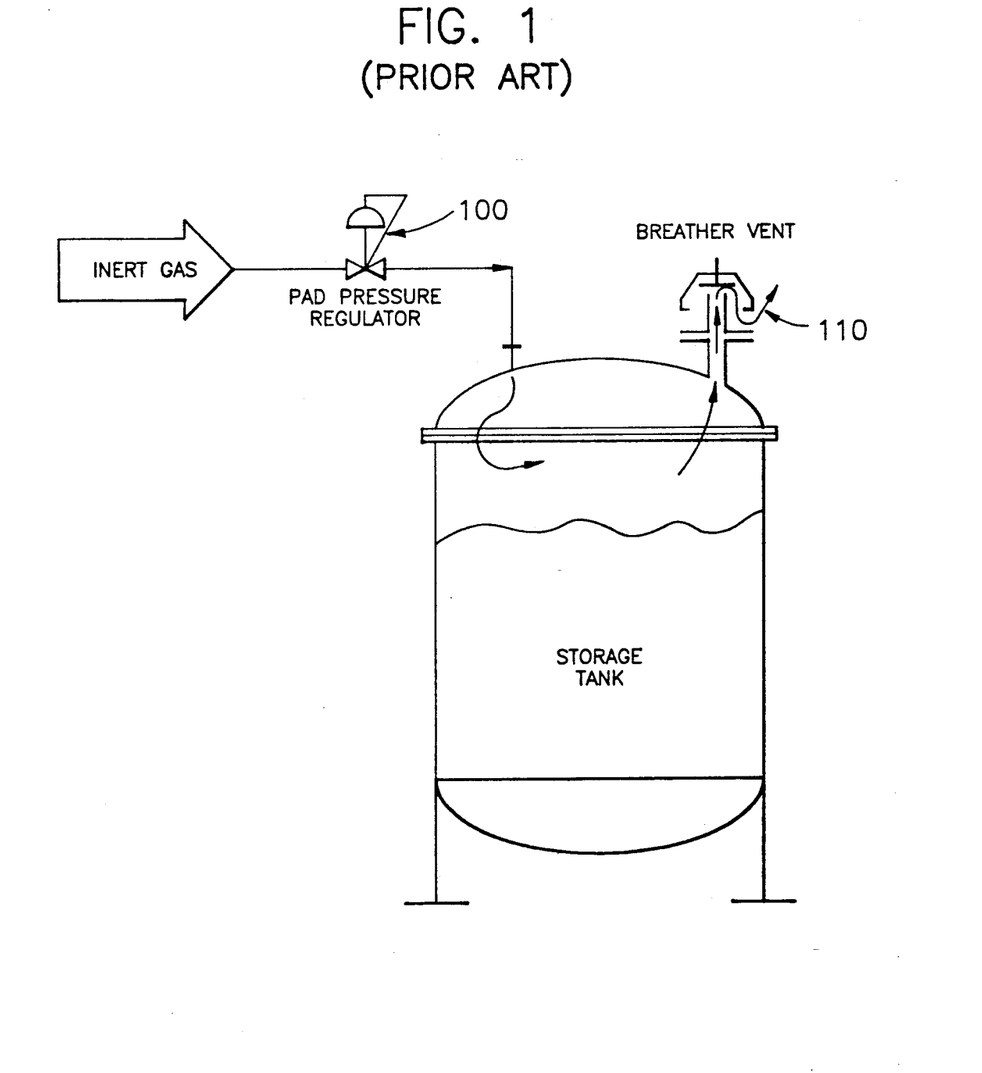
FIG. 1 is a schematic representation of a precision gas pressure regulator of the prior art.

A second prior art method, represented in FIG. 1, involves the use of a pad pressure regulator 100 and a low pressure relief device 110. An example of such a pad pressure regulator 100 can be found in U.S. Pat. No. 4,274,440 is hereinafter incorporated by reference. The pad pressure regulator 100 operates independently from the relief device 110 and concerns itself with the supply of gas in response to under-pressure conditions. The relief device 110, on the other hand, is designed to address the over-pressure situation relieving any excess pressure. These low pressure tank vent devices include a solid pallet, diaphragm pallet, liquid seal, or pilot operated design. The concern over vacuum is normally addressed in the same tank vent device. However, should a vacuum occur resulting from a failure of the pad pressure regulator 100, outside air will back flood the system, and in systems containing flammable solvents, this is especially undesirable as the resultant mixture could be explosive. Vacuum relief devices on systems containing flammable materials should, therefore, be equipped to back flood with an inert gas. Failure to recognize, understand, and address this issue with proper system design has, in the past, provided disastrous results.

Figure 2:
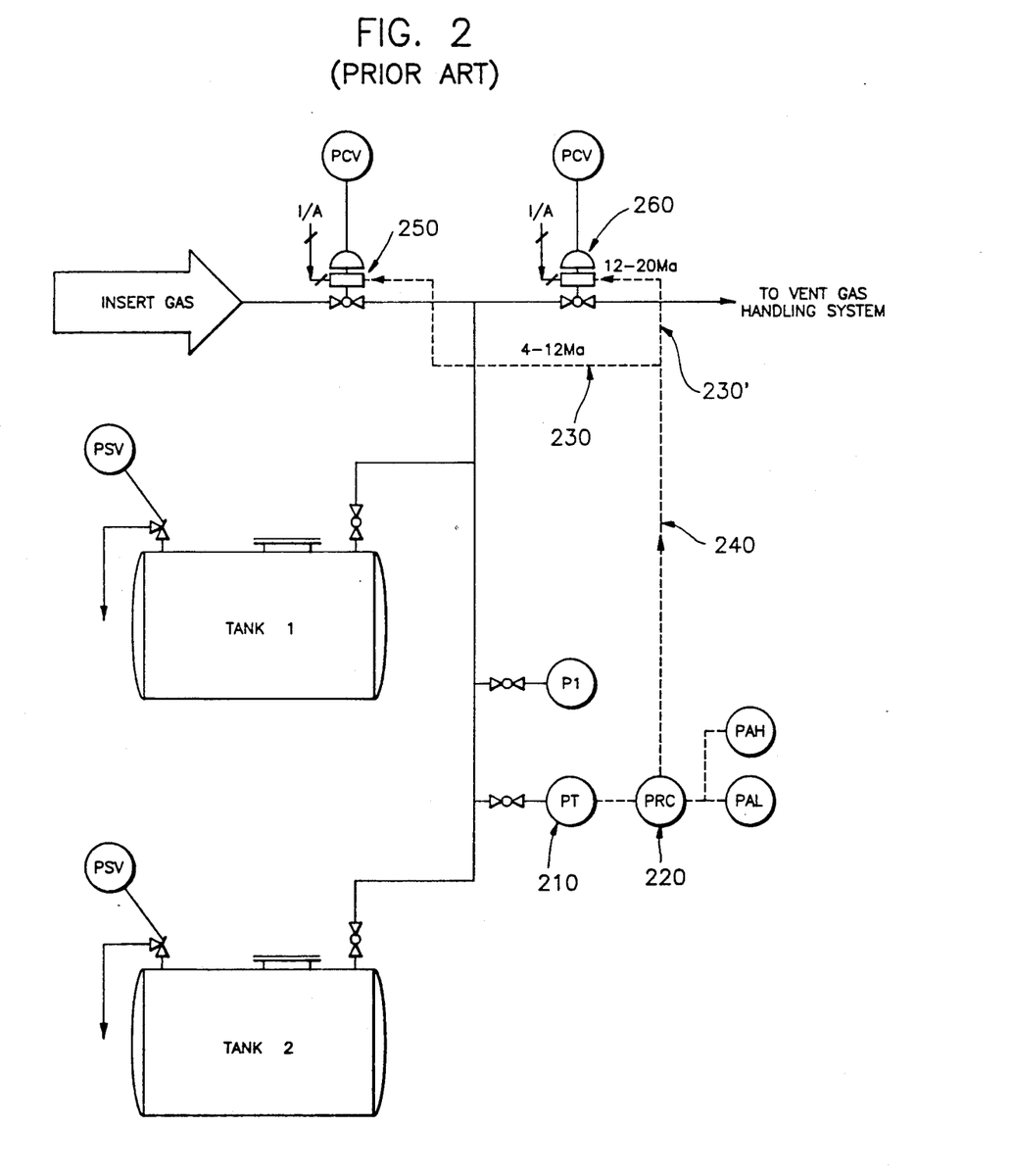
FIG. 2 is a schematic representation of a split range pressure control system of the prior art.

A third prior art method involves the use of multiple pneumatic or electro-pneumatic control valves operating on a split range signal from an analog controller, as depicted in FIG. 2. A very sensitive pressure sensor-transmitter (PT) 210 transmits the process pressure to an electronic-type controller (PRC) 220 which sends a split range signal to the pad control valve (PCV) 250 and the depad control valve (PCV) 260 via signal lines 230 and 230', respectively. Signal lines 230 and 230' are the results of a split in a primary signal line 240. This approach can provide precision control in the less than one PSIG range, but at a significantly higher cost than the two previous methods. To install a system similar to the one illustrated in FIG. 2, one should expect to spend $12,000 to $20,000 for purchase and installation of all the components, and this estimate assumes that power and instrument air are in close proximity. This investment will also require the support of a competent instrument technician with programming experience for start-up and maintenance service. In addition, this system cannot operate independently from a source of power. Therefore, electrical or battery power becomes necessary.

SUMMARY OF THE INVENTION

The PDP unit of the present invention is provided as an improvement over the pad pressure regulator 100 illustrated in FIG. 1 and disclosed in U.S. Pat. No. 4,274,440. The PDP unit of the invention comprises a number of components including a first stage regulator, a pad filter regulator, two in-line orifice tees, a pad control valve, a pad sensing regulator, a depad filter regulator, a depad control valve, a depad sensing regulator, and an optional check valve.

It is an object of the present invention to provide a precision pressure regulating system, that is not only capable of providing added gas pressure in response to a low pressure situation, but also capable of relieving an over-pressure condition by venting-off excess pressure.

It is another object of the present invention to provide the aforementioned pressure regulating system in a self-contained unit such that the system can be utilized in remote locations, where external sources of power including electrical, mechanical, and battery power are unavailable or inconvenient.

It is yet another object of the present invention to regulate with extreme sensitivity, fast response, and positive shut-off the supply of make-up gas for the vessel, as well as the venting of any excess gas from a vessel.

A still further object of the present invention is to provide an extremely accurate, self-contained pressure regulating system capable of maintaining a constant pressure which is accurate to plus or minus 0.1 inch of water column in a range from 0.5 inches of water column to 56 inches of water column.

An additional object of the present invention is to provide a self-contained precision pressure regulating system having adjustable upper and lower set points so that depressurization occurs at the upper limit and pressurization at the lower limit. Hereinafter pressurization is referred to as padding, while de-pressurization is referred to as de-padding.

A still further object of the present invention is to provide a means for minimizing thermal expansion emissions, which includes inert gas as well as volatile products, from tanks and systems containing these volatile chemicals. This is accomplished by allowing for the adjustment of a pad pilot sensing regulator set point, as well as a depad pilot sensing regulator set point.

A further object of the invention is to provide an arrangement having redundant pressure relief devices located at all points of pressure reduction within the system for maximum safety.

As a still further object of the invention, the precision pressure regulator of the present invention provides automatic control of an inert gas blanket in a pressurized vessel thereby eliminating the need for constant supervision by a technician.

An additional object is to achieve these objects with a relatively simple mechanical system, so as to minimize the cost of construction, eliminate or reduce maintenance problems, and minimize service interruption time.

These together with other objects which will become subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 3:
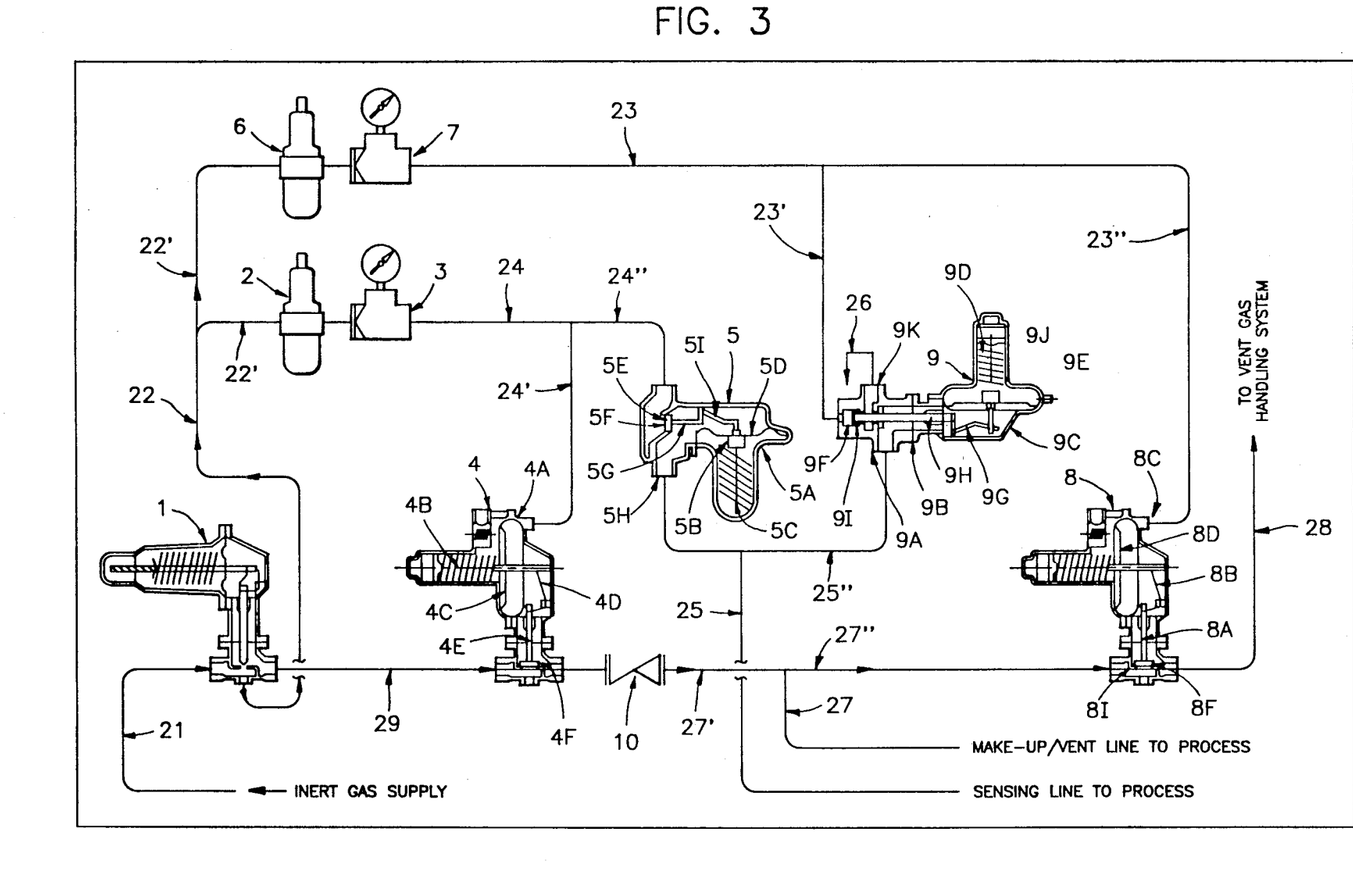
FIG. 3 is a schematic representation of the precision PDP gas pressure regulator of the present invention.

With reference to FIG. 3, a PDP system, in accordance with the present invention, is substantially comprised of a pad diaphragm control valve 4 and a depad diaphragm control valve 8 driven by a pad sensing regulator 5 and a depad sensing regulator 9 respectively which, in turn, are supplied with reduced gas pressure from a pad filter regulator 2 and a depad filter regulator 6 respectively. A first stage regulator 1 supplies inert gas line pressure from a main inert gas supply line 21 to the pad filter regulator 2 and the depad filter regulator 6 via gas supply lines 22" and 22' respectively. Gas supply lines 22" and 22' are the resulting branches of a split in a gas supply line 22 which, incidentally, provides the path for inert gas coming from the first stage regulator 1 to the individual gas supply lines 22" and 22'. In addition, the first stage regulator 1 provides reduced line pressure, typically in the range of five to ten PSIG, to a pad control valve 4 via a gas transfer line 29. Should no reduction be required in the line pressure, the main inert gas supply line 21 could be connected directly to the pad diaphragm control valve 4 which would, in turn, supply inert gas line pressure to pad filter regulator 2 and depad filter regulatar 6. Also, a depad in-line orifice 7 and pad in-line orifice 3 restrict the rate of gas flow into depad line 23 and pad line 24 respectively. Depad line 23 branches into two separate lines, depad lines 23' and 23", while pad line 24 also branches into two distinct lines, pad lines 24' and 24". The restricted rate of gas flow is obtained by virtue of the orifice size, which is typically 0.028 inches. The orifice size, however, can vary depending upon system operating requirements. A check valve 10 is also provided as an option to provide enhanced protection against process or vessel (hereinafter referred to as process) pressure back-flow into the pad diaphragm control valve 4.

The pad sensing regulator 5 is that as specified in U.S. Pat. No. 4,274,440, and in particular, is comprised of a direct acting regulator designed to supply make-up gas to the pad diaphragm control valve 4 via the combination of pad lines 24' and 24". Into pad sensing regulator 5 is connected the pad line 24" and the process pressure sensing line 25'. Process pressure sensing line 25' is just one branch from a process pressure sensing line 25. The other branch, process pressure sensing line 25", leads to the depad portion of the invention which will be discussed later in this description. The diaphragm case 5A of the pad sensing regulator 5, contains a weighted 5B, spring 5C loaded, inverted diaphragm 5D which causes the valve seat 5E to move toward or away from the valve seating area 5F in response to the prevailing pressure condition.

The depad sensing regulator 9 is made reverse acting by the addition of a pilot loading block 9A to the sensing regulator body 9B. Into regulator 9 is connected the depad sensing regulator gas supply line 23', the process pressure sensing line 25", and a pressure exhaust line 26. Pressure changes in the process are communicated to the diaphragm housing 9C of regulator 9 by process pressure sensing line 25". This causes the spring 9D loaded diaphragm 9E of the regulator 9 to flex. This flexing action is then communicated within the regulator 9 to its valve seat 9F by a lever arm 9G and valve stem 9H. Movement of the valve seat 9F against or away from the valve seating area 9I will pre-determine whether the line pressure in the depad line 23 and its related branches 23' and 23", will be maintained or reduced by virtue of the position of the valve seat 9F relative to the valve seating area 9I.

As an alternative, the exhaust line 26 can be connected into the valve body of the depad diaphragm control valve 8 to allow contained exhausting of the gas vented through an exhaust port of the depad sensing regulator 9 by line 26.

The operation of the system of the invention will hereinafter be described. Due to prior achievement of preset condition, under static conditions (i.e., the pressure in process pressure sensing line 25 and its associated branches 25' and 25" neither exceeds the low set point of the pad sensing regulator 5 nor the high set point of the depad sensing regulator 9), the pad diaphragm control valve 4 and depad diaphragm control valve 8 are closed, and hence there is no flow in the system. Only static pressure remains in gas supply line 22, depad line 23, and pad line 24, as well as their associated branches.

As the pressure begins to drop in the vessel, as evidenced in vessel connected pressure sensing lines 25, 25', 25", the pressure in the diaphragm case 5A of the pad sensing regulator 5 will begin to drop. This pressure decrease allows the spring 5C to force the weighted 5B diaphragm 5D up, in turn, forcing the valve (seat 5E via valve stem 5G, pivoting) on arm 5I, to pull away from the valve seating area 5F.

This action effects a pressure reduction in pad lines 24, 24', and 24" as inert gas pressure now begins to bleed through the valve seating area 5F, out the sensing port 5H and into process pressure sensing line 25'. This flow is restricted by the pad in-line orifice 3. Concurrently, a pressure reduction occurs in the diaphragm case 4A of the pad diaphragm control valve 4. This forces the internal spring 4B loaded diaphragm 4C to push against the internal lever arm 4D, and this lever arm 4D, in turn, pulls on the valve 4E, thereby effecting the opening of the valve seating area 4F. This allows make-up gas to flow into the vessel via the make-up/vent line, 27. As the pressure deficiency in the process is corrected, the pressure in process pressure sensing lines 25, 25', and 25" rises, forcing the diaphragm 5D in the pad sensing regulator 5 to compress the spring 5C, which in turn, drives the valve seat 5E into the valve seating area 5F. The pressure in pad lines 24, 24', and 24" then rises and causes the pad diaphragm control valve 4 to close, thereby stopping the flow of make-up gas into the process.

As the process pressure rises above the set point in the pad sensing regulator 5, the pressure in sensing lines 25, 25', and 25" will increase. The increasing pressure is felt in the diaphragm case 9C of depad sensing regulator 9, and as a result, the weighted 9J diaphragm 9E is pushed up against the force of the spring 9D. This causes the valve seat 9F in this reverse acting regulator to push away from the valve seating area 9I. As the valve-seat 9F exposes the valve seating area 9I, pressure in depad lines 23, 23', and 23" begins to decrease, venting the gas from the reverse acting regulator into exhaust line 26 via the exhaust port. Again, this flow through the exhaust port is restricted by the depad in-line orifice 7. As the pressure in the depad lines 23, 23', and 23" decreases, so does the pressure in the diaphragm case 8C of the depad diaphragm control valve 8. Because this particular diaphragm control valve functions in the same manner as the pad diaphragm control valve, the pressure reduction in the diaphragm case 8C causes the valve seat 8F to move away from the valve seating area 8I, thus allowing the excess pressure in the process to vent via line 27 and 27", through the valve seating area 8I and into a vent gas line 28.

As the vessel over-pressure is reduced, so is the pressure in the process pressure sensing lines 25, 25', and 25" and hence in the diaphragm case 9C of the depad sensing regulator 9. This decrease in pressure causes the internal spring 9D to force the diaphragm down 9E, which in turn, pulls the valve seat 9F back toward the valve seating area 9I. This movement will continue until the process pressure is reduced to the depad set point pressure. At this point, the exhaust port 9K is closed off. Subsequently, the pressure in depad lines 23, 23', and 23", will begin to rise, causing the pressure in the diaphragm case 8C of depad diaphragm control valve 8 to rise. The control valve then closes and thus terminates the flow from the process into vent gas line 28.

In accordance with one aspect of the present invention, the sensing regulators of the PDP unit can be set to facilitate expansion or contraction of the PDP unit deadband. That is, the difference between the pad sensing regulator and the depad sensing regulator set points, can be adjusted in accordance with user requirements. Deadbands are usually set to control at a minimum of 2 inches water column, and accuracy at either end of the deadband is typically plus or minus 0.1 inches water column. The pad sensing regulator set point can be as low as 0.5 inches water column while the depad sensing regulator can be set as high as 56 inches of water column or approximately two PSIG.

In addition, a plurality of pressure relief devices can be employed in selective locations to prevent the over-pressurization of system components.

The aforementioned PDP device, in accordance with the present invention, has an unlimited number of applications. The following examples are not intended to limit the scope of the invention, but rather provide illustrative examples of such applications. It is well understood that the PDP device has application wherever one desires precise low pressure control, exclusion of outside airborne contaminants, maintenance of positive system pressure, minimum usage of inert gas, minimum loss of volatile chemicals, or maintenance of an inert operating atmosphere. Furthermore, it is also understood that the PDP device finds use in conjunction with any combination of the aforementioned criteria, as well as in cases where access to a power supply is either impossible or impractical.

Examples of practical applications include a centrifuge system, drum-filling/unloading system, knock out system, tank farm system, batch reactor system, distillation system, and a vent conservation system - tank farm.

In one particular application, the PDP unit can be used to control the pressure on a centrifuge system which includes a basket type centrifuge, centrate tank, and a receiver for liquid. All three vessels have vent lines which tie into a common manifold. This common manifold is used to maintain a constant, low pressure, inert gas blanket on the entire system, the gas blanket being controlled by the PDP unit. In this case, the PDP unit can have a pad pressure setting of 4 inches W.C. and a depad pressure setting of 6 inches W.C. Manual pad-depad valves can also be included to allow rapid displacement of oxygen from the system prior to startup.

After initial application of inert gas using a manual pad-depad method, the PDP unit of the invention is capable of supplying inert gas to the system on demand and venting off excess pressure as needed to maintain the desired pressure.

With regard to system operation, upon start-up, the centrifuge acts much like an air pump discharging a mixture of liquid and gas into the centrate tank. The centrate tank separates the liquid from the gas and allows the gas to vent back to the top of the centrifuge. This is essentially a closed loop which recirculates the gas. Hence, the centrifuge pressure remains relatively stable. As the level builds in the centrate tank, a pump on level control, discharges excess liquid to the receiver. Gas displaced from the receiver is used to replace liquid withdrawn from the centrate tank. Any excess pressure generated in the system is vented through the depad side of the PDP unit to the vent system. The PDP unit essentially isolates the centrifuge from the vent system, which would normally operate at a slight vacuum or at atmospheric pressure.

The benefits of using such a system include minimization or elimination of the potential for explosion, minimization of pressure on the centrifuge sealing surfaces, minimization of volatile chemical losses, elimination of constant purge requirements, minimization of inert gas usage, as well as the minimization of costs for pressure control instruments.

As an application of the PDP system, the PDP unit can also be integrated into a drum filling station to insure that an inert atmosphere is maintained in a drum containing flammable, reactive, or sensitive materials. The drum station includes a PDP unit which is adjusted to operate at five to fifteen inches of water column, and having a pad-depad manifold terminated with an isolation valve and flexible connection. A flexible line is connected to a ½ inch vent connection on the drum. A pressure safety valve and a low pressure indicating gauge are included to monitor and prevent accidental over-pressurization of the drum. The PDP sensing line is connected to the manifold within close proximity to the flexible line connection, and thereby senses the pressure on the drum. This particular system can be operated at five to fifteen inches of water column without any harm being done to the DOT rated drum.

Similarly, the drum filling/unloading line is connected to a dip tube constructed with a flexible line of appropriate material, the dip tube being threaded into a 2" connection on the drum.

With regard to system operation, in the case where the drum is being filled with a sensitive material, the drum is first inerted by allowing the PDP unit to purge into the drum, through the dip tube, and out a drum vent valve. After completing an appropriate purge, the drum vent valve is closed. The PDP unit then begins to sense the build-up of pressure, discontinues the purge when the pressure rises to a predetermined value, and continues to maintain the preselected pressure setting of the PDP unit. As the drum is filled with liquid, inert gas is displaced through the PDP unit to an appropriate vent handling system operating at a slight vacuum or at atmospheric pressure.

In the drum unloading case, the dip tube is inserted into the drum, and then connected to a flexible line which thereby links it to the unloading line. The inerting system is then connected to the drum via a flexible connection and the manual valve slowly opened to thus allow the PDP unit to take, install, and maintain a positive pressure inert blanket over the drum's contents. This inert blanket is maintained while the drum is being unloaded. As a self priming pump begins to draw material from the drum, the liquid withdrawn is replaced by inert gas thereby eliminating intrusion of outside contaminants. When unloading is complete, the inerting system is isolated and disconnected, the drum vented through the drum vent valve, and the dip tube removed.

By utilizing the aforementioned arrangement, a number of objectives are achieved. Included in these objectives is the maintenance of an inert loading/unloading environment as well as the minimization of inert gas usage in the process.

A still further application of the PDP unit involves a knock out system. In this case, the PDP unit is installed such that an inert blanket is maintained simultaneously on an appropriate selection of vessels. The vent headers from three tanks, for example, are manifolded into a knock out tank inlet header. The tank is additionally fitted with a high level switch and pressure relief valve. The PDP unit is installed in the vent line from the knock out tank with the sensing line being tied into the top of the knock out tank. In this manner, the entire system pressure can be controlled, and is normally kept at five to ten inches of water column.

With regard to system operation, upon initial start-up, a set of manual pad and depad valves are used to inert the knock out tank and other tanks connected to the system if desired. The system is pressurized to fifteen PSIG and subsequently vented. The cycle is repeated and then the PDP sensing line opened to the system. The PDP unit now takes over pad-depad operations to maintain the desired low pressure. Pressure excesses or deficiencies resulting from thermal or physical actions in the storage tanks are addressed and responded to by the PDP unit. Should any tank overfill, the knock out will catch the excess liquid and still allow the PDP unit to maintain the desired pressure. If this occurs, a high level alarm can announce the presence of liquid in the knock out tank, and appropriate measures can then be taken.

The benefits of utilizing the aforementioned system include the maintenance of an inert blanket for storage tanks, minimization of inert gas usage, minimization of active and passive emissions, automatic control of system pressure requirements, as well as the minimal investment required with regard to pressure control instrumentation.

An additional application of the PDP unit involves a tank farm system. In particular, the PDP unit is integrated into storage tank vent lines to maintain a constant, low pressure inert blanket (usually five to fifteen inches of water column) on all three vessels simultaneously (assuming three tanks are being used). Vent headers from the three separate vessels, each containing compatible liquids, are manifolded through a common PDP unit which, in turn, has manual pad and depad valves. The PDP unit is connected to an inert gas supply and to a vent handling system. Liquid can be pumped, for example, from a first tank to a second tank and a third tank, the third tank can be pumped to a tank truck, and a vent manifold can be provided to vent the tank truck back to the first tank during the fill operation.

With regard to system operation, the system is initially inerted using the manual pad-depad valves with the PDP sensing line isolated. After inerting is complete, the PDP unit is put back on line to maintain a constant, low pressure inert gas blanket on all three tanks.

As liquid is pumped from the first tank to the second or third tank, the vapor displaced is vented back to the second tank. When a tank truck is filled from the second tank, the truck is first inerted manually and then opened to the storage tank. During the fill operation, vapor vented from the truck, replaced the liquid taken from the second tank. During both operations, essentially no vapors are vented through the PDP unit. This minimizes passive emissions to the environment or vent handling systems. Passive emissions will occur when the first tank is filled with product because the incoming liquid displaces vapor.

Changes in ambient temperature will result in a pressure deficiency or excess. Excesses, or active emissions, will be vented through the PDP unit and deficiencies will be replaced by inert gas.

By using the above mentioned embodiment, a number of advantages are realized. These advantages include the minimization of inert gas usage, minimization of active and passive emissions, minimization of product losses, and the maintenance of an inert blanket for storage tank operations.

Another application for the PDP unit of the present invention relates to its use in conjunction with a batch reactor system. In particular, a jacketed batch reactor is supplied with a heat exchanger and receiver to collect condensed liquid. The reactor is vented through a condenser and then through the PDP unit as is the receiver. Manual pad-depad valves are provided around the PDP unit to expedite manual inerting procedures.

In operation, the system is manually inerted via the manual pad and depad valves prior to system start-up. This is accomplished by raising the system pressure to fifteen PSIG and subsequently venting the system. The cycle is repeated a minimum of two times. During this procedure, the PDP sensing line is isolated. When the procedure is completed, the PDP unit is placed back on line and continues to maintain an inert blanket on the entire system. No additional purge is necessary to maintain or insure the presence of an inert operating atmosphere in the system.

As liquid is transferred into the batch reactor, the gas displaced is vented through the PDP unit to an appropriate vent handling system. This results in a passive emission which is minimized by venting through the condenser.

When heat is placed on the batch reactor, the concentration of solvent in the vapor will increase and eventually replace the inert gas as the system is brought up to a full boil. The solvent concentrations will proceed through the critical zone between the lower explosive limit and the upper explosive limit. During this transition, it is imperative that the oxygen concentration in the non-condensables be less than that required to support combustion of the solvent laden vapor. By preparing the system using the manual pad-depad method and then placing the automatic PDP unit of the invention on line, there will be insufficient oxygen in this system to support combustion. As condensed vapors enter the receiver, the inert gas displaced will vent through the PDP unit.

When the reaction is completed and the heat removed, the system will cool and vapors condense. Condensing vapors will be replaced by inert gas as the PDP unit senses a reduction in system pressure.

By using the PDP unit in the above-mentioned application, a number of advantages are realized. These advantages include the maintenance of an inert gas blanket during reactor operation, minimization of inert gas usage, and the minimization of investment in pressure control instruments.

A still further application of the PDP unit involves its use in conjunction with a distillation system. This simple distillation system includes a column, overhead condenser, reflux drum, and reboiler. The system vents through the overhead condenser to the PDP unit which is supplied with inert gas and connected to a vent header. The PDP unit maintains the desired set pressure and the inert gas blanket on the system. Manual pad-depad valves are provided to expedite manual inerting procedures.

In operation, the system is prepared by inerting using the manual pad-depad procedures after which the PDP unit is placed on line, thereby insuring that the amount of oxygen present in the system at start-up and during operation, does not exceed the maximum recommended concentration (usually less than 8%), for organic solvents.

When the reboiler is charged with crude material for distillation, the vapors displaced are inert and vented through the overhead condenser to the PDP unit and out through the vent header. As heat is applied to the reboiler, the concentration of the solvent in the vapors increases, proceeding through the lower explosive limit (LEL) up to and through the upper explosive limit (UEL). The non-condensable inerts are vented from the overhead condenser to the PDP unit and out the vent header. It is imperative here again, that there be less than the minimum amount of oxygen required for combustion of the solvent laden vapors while passing through the LEL - UEL critical zone. Once past the UEL, the potential for combustion is near zero.

The PDP unit will continue to maintain an inert blanket on the reflux drum during the distillation. When the heat is shut off, the system will begin to cool down and the saturated solvent vapors will subsequently condense. As the cool down proceeds, the PDP unit senses a slight vacuum and bleeds in the correct amount of inert gas to replace the condensing vapors. This, in turn, not only maintains the desired pressure, but the desired inert gas blanket as well. As long as the system remains under a slight positive pressure after initial inerting, the presence of a safe operating environment will be virtually guaranteed. In this manner, to insure a safe environment, constant purges are unnecessary, increase the loss of product from the system, increase the heat load requirements of the overhead condenser, and are wasteful of inert gas.

The benefits of using the PDP unit in conjunction with the aforementioned embodiment include the maintenance of an inert gas blanket in the entire system, minimization of inert gas usage, and the minimization of investment in pressure control instruments.

An additional application for a PDP unit involves a vent conservation system. In particular, this system involves three storage tanks containing compatible materials vented to a common knock out tank and then to a PDP unit. The PDP unit maintains the desired set pressure (usually five to ten inches of water column) and an inert gas blanket on the system. Included also are primary vent condensers at each storage tank and a secondary vent condenser located on the outlet of a knock out tank. It may be possible to operate with only the knock out tank vent condenser, thus minimizing the number of condensers required in the system. The PDP unit is provided with manual pad-depad valves and a sensing line tied into the knock out tank. Separate inert gas valves are provided at each tank for pressure transfers or inerting.

In operation, the system is initially inerted using the manual pad and depad valves, or each tank separately using a manual nitrogen supply valve which can also be provided. When inerting tanks separately, the pressure is raised to fifteen PSIG and vented off to the rest of the system at least twice. If inerting the system using the manual pad-depad valves, the PDP sensing line is isolated and then re-opened upon completion of the inerting procedure.

When the tanks are filled with liquid, the vapors are vented through the primary vent condensers, through the knock out tank, through a secondary vent condenser, and out through the PDP unit. The condensables in these passive emissions are minimized by the presence of vent condensers, the size of which is minimized by the elimination of continuous purges.

Tank overfills are drained to the knock out tank and can be announced by a high level alarm. A low pressure alarm can announce a loss of the inert gas blanket on the system.

By using the PDP unit of the present invention in the aforementioned embodiments, a number of favorable advantages are obtained. Included in these advantages are the minimization of inert gas usage, minimization of product loss to the environment, minimization of investment in pressure control instruments, and automatic control of the resulting inert gas blanket.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A gas pressure regulating system for maintaining the internal gas pressure of a vessel between a selectively adjustable upper limit and a selectively adjustable lower limit, said gas pressure regulating system comprising:

a vessel, a supply of pressurized inert gas, a main pressurized gas supply line connected to said supply, a first regulator means for reducing pressure from said gas supply line, a second regulator means for reducing pressure from said gas supply line, a first control regulator connected to said first regulator means and said gas supply line and having spring means for allowing gas flow proportionate to the increasing or decreasing pressure of the system, a second control regulator connected to said first control regulator and to said second regulator means and having spring means for allowing gas flow proportionate to the increasing or decreasing pressure of the system, a sensing line connected to said vessel, a make-up vent/line connected to said vessel and to said second control regulator, a direct acting sensing regulator connected to said first regulator means and said sensing line and having spring means for allowing gas flow proportionate to the increasing or decreasing pressure of the system, a reverse acting sensing regulator connected to said second regulator means and said sensing line and having spring means for allowing gas flow proportionate to the increasing or decreasing pressure of the system, said direct acting sensing regulator being set to a predetermined lower limit of a desired internal gas pressure in said vessel and said reverse acting sensing regulator being set to a predetermined upper limit at a desired internal gas pressure in said vessel, said vessel upon having a pressure below said predetermined lower limit as conveyed by said sensing line to said direct acting sensing regulator causes said first control regulator to allow said main pressurized gas supply line to introduce pressurized gas into said vessel through said make-up/vent line, said vessel upon having a pressure above said predetermined upper limit as conveyed by said sensing line to said reverse acting sensing regulator causes said second control regulator to allow gas to be vented through said second control regulator from said make-up/vent line, and said first control regulator, said second control regulator, said direct acting sensing regulator and said reverse acting sensing regulator cooperating together to maintain pressure in said vessel between said predetermined lower limit and said predetermined upper limit by modulating action of their respective spring means while acting in the absence of a source of electrical power.

2. A gas pressure regulating system as claimed in claim 1, wherein a regulator is located between said gas supply line and both said first and said second regulator means.

3. A gas pressure regulating system as claimed in claim 1, wherein a vent gas handling system is connected to said second control regulator for relief of over-pressurization in said process container.

4. A gas pressure regulating system as claimed in claim 1, wherein said first regulator means includes a pressure regulator and an in-line orifice.

5. A gas pressure regulating system as claimed in claim 1, wherein said second regulator means includes a pressure regulator and an in-line orifice.

6. A gas pressure regulating system for maintaining the internal gas pressure of a vessel between a selectively adjustable upper limit and a selectively adjustable lower limit, said gas pressure regulating system comprising:

a vessel, a supply of pressurized inert gas, a main pressurized gas supply line connected to said supply, a first control regulator connected to said gas supply line and having spring means for allowing gas flow proportionate to the increasing or decreasing pressure of the system, a second control regulator connected to said first control regulator and having spring means for allowing gas flow proportionate to the increasing or decreasing pressure of the system, a sensing line connected to said vessel, a make-up/vent line connected to said vessel and to said second control regulator, a first sensing regulator connected to said first control regulator and said sensing line and having the spring means for allowing gas flow proportionate to the increasing or decreasing pressure of the system, a second sensing regulator connected to said second control regulator and said sensing line and having spring means for allowing gas flow proportionate to the increasing or decreasing pressure of the system, said first sensing regulator being set to a predetermined lower limit of a desired internal gas pressure in said vessel and said second sensing regulator being set to a predetermined upper limit at a desired internal gas pressure in said vessel, said vessel upon having a pressure below said predetermined lower limit as conveyed by said sensing line to said first sensing regulator causes said first control regulator to allow said main pressurized gas supply line to introduce pressurized gas into said vessel through said make-up/vent line, said vessel upon having a pressure above said predetermined upper limit as conveyed by said sensing line to said second sensing regulator causes said second control regulator to allow gas to be vented through said second control regulator from said make-up/vent line, and said first control regulator, said second control regulator, said direct acting sensing regulator and said reverse acting sensing regulator cooperating together to maintain pressure in said vessel between said predetermined lower limit and said predetermined upper limit by modulating action of their respective spring means while acting in the absence of a source of electrical power.

7. A gas pressure regulating system as claimed in claim 6, wherein gas regulator is located between said gas supply line and both said first and said second control regulators.

* * * * *